US012462818B2

(12) United States Patent
Jansson Toftgård et al.

(10) Patent No.: US 12,462,818 B2
(45) **Date of Patent: *Nov. 4, 2025**

(54) METHOD AND APPARATUS FOR ADAPTIVE CONTROL OF DECORRELATION FILTERS

(71) Applicant: TELEFONAKTIEBOLAGET LM ERICSSON (PUBL), Stockholm (SE)

(72) Inventors: Tomas Jansson Toftgård, Uppsala (SE); Tommy Falk, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,932

(22) Filed: Feb. 21, 2024

(65) Prior Publication Data

US 2024/0274138 A1 Aug. 15, 2024

Related U.S. Application Data

(63) Continuation of application No. 17/986,830, filed on Nov. 14, 2022, now Pat. No. 11,942,098, which is a (Continued)

(51) Int. Cl.
*G10L 19/008* (2013.01)
*H04S 3/00* (2006.01)

(52) U.S. Cl.
CPC ............ *G10L 19/008* (2013.01); *H04S 3/008* (2013.01); *H04S 2400/01* (2013.01); *H04S 2420/03* (2013.01); *H04S 2420/07* (2013.01)

(58) Field of Classification Search
CPC ... G10L 19/008; H04S 3/008; H04S 2400/01; H04S 2420/03; H04S 2420/07
(Continued)

(56) References Cited

U.S. PATENT DOCUMENTS 8,015,018 B2 * 9/2011 Seefeldt ................ G10L 19/008 381/23
10,950,247 B2 3/2021 Toftgård et al.
(Continued)

FOREIGN PATENT DOCUMENTS

| | | | |
|---|---|---|---|
| CN | 101521010 | A | 9/2009 |
| CN | 10-2015-0106962 | A | 9/2015 |

(Continued)

OTHER PUBLICATIONS

International Search Report and the Written Opinion of the International Searching Authority, issued in corresponding International Application No. PCT/EP2017/080219, dated Jan. 22, 2018, 15 pages.

(Continued)

*Primary Examiner* — William A Jerez Lora

(74) *Attorney, Agent, or Firm* — Rothwell, Figg, Ernst & Manbeck, P.C.

(57) ABSTRACT

An audio signal processing method and apparatus for adaptively adjusting a decorrelator. The method comprises obtaining a control parameter and calculating mean and variation of the control parameter. Ratio of the variation and mean of the control parameter is calculated, and a decorrelation parameter is calculated based on the said ratio. The decorrelation parameter is then provided to a decorrelator.

20 Claims, 6 Drawing Sheets

Related U.S. Application Data continuation of application No. 17/201,030, filed on Mar. 15, 2021, now Pat. No. 11,501,785, which is a continuation of application No. 16/463,619, filed as application No. PCT/EP2017/080219 on Nov. 23, 2017, now Pat. No. 10,950,247.

(60) Provisional application No. 62/430,569, filed on Dec. 6, 2016, provisional application No. 62/425,861, filed on Nov. 23, 2016.

(58) Field of Classification Search
USPC ........................ 381/1, 5, 22, 23, 56, 58, 124
See application file for complete search history.

(56) References Cited

U.S. PATENT DOCUMENTS

| | | | | |
|---|---|---|---|---|
| 2002/0176585 | A1* | 11/2002 | Egelmeers | H03H 21/0012 381/71.11 |
| 2008/0015845 | A1 | 1/2008 | Schmidt et al. | |
| 2009/0262950 | A1* | 10/2009 | Farhang | H04R 3/005 381/66 |
| 2013/0194390 | A1 | 8/2013 | Hirooka | |
| 2013/0195276 | A1 | 8/2013 | Ojala | |
| 2014/0307878 | A1 | 10/2014 | Osborne et al. | |
| 2016/0005406 | A1* | 1/2016 | Yen | H04S 3/008 381/23 |
| 2016/0189723 | A1 | 6/2016 | Davis | |
| 2017/0365268 | A1* | 12/2017 | Davis | G10L 19/018 |
| 2018/0012137 | A1 | 1/2018 | Wright et al. | |

FOREIGN PATENT DOCUMENTS

| | | | |
|---|---|---|---|
| JP | 2006-524832 | A | 11/2006 |
| JP | 2007-65497 | A | 3/2007 |
| JP | 2007124678 | A | 5/2007 |
| JP | 2012-124616 | A | 6/2012 |
| JP | 2016-510434 | A | 4/2016 |
| JP | 2020502562 | A | 1/2020 |
| WO | 2018096036 | A1 | 5/2018 |

OTHER PUBLICATIONS

Notice of Preliminary Rejection dated Jan. 21, 2020, issued in Korean Patent Application No. 10-2019-7017588, 9 pages.

* cited by examiner

METHOD AND APPARATUS FOR ADAPTIVE CONTROL OF DECORRELATION FILTERS

CROSS REFERENCE TO RELATED APPLICATION(S)

This application is a continuation of and claims priority to U.S. patent application Ser. No. 17/986,830, filed Nov. 14, 2022, which is a continuation of and claims priority to U.S. patent application Ser. No. 17/201,030, filed Mar. 15, 2021, now U.S. Pat. No. 11,501,785, which is a continuation of and claims priority to U.S. patent application Ser. No. 16/463,619, filed May 23, 2019, now U.S. Pat. No. 10,950, 247, which is a 35 U.S.C. § 371 National Phase Entry Application from PCT/EP2017/080219, filed Nov. 23, 2017, designating the United States, which claims the benefit of U.S. Provisional Application No. 62/425,861, filed Nov. 23, 2016, and U.S. Provisional Application No. 62/430,569, filed Dec. 6, 2016. The disclosures of each of the identified applications are incorporated herein by reference in their entirety.

TECHNICAL FIELD

The present application relates to spatial audio coding and rendering.

BACKGROUND

Spatial or 3D audio is a generic formulation, which denotes various kinds of multi-channel audio signals. Depending on the capturing and rendering methods, the audio scene is represented by a spatial audio format. Typical spatial audio formats defined by the capturing method (microphones) are for example denoted as stereo, binaural, ambisonics, etc. Spatial audio rendering systems (headphones or loudspeakers) are able to render spatial audio scenes with stereo (left and right channels 2.0) or more advanced multichannel audio signals (2.1, 5.1, 7.1, etc.).

Recent technologies for the transmission and manipulation of such audio signals allow the end user to have an enhanced audio experience with higher spatial quality often resulting in a better intelligibility as well as an augmented reality. Spatial audio coding techniques, such as MPEG Surround or MPEG-H 3D Audio, generate a compact representation of spatial audio signals which is compatible with data rate constraint applications such as streaming over the internet for example. The transmission of spatial audio signals is however limited when the data rate constraint is strong and therefore post-processing of the decoded audio channels is also used to enhanced the spatial audio playback. Commonly used techniques are for example able to blindly up-mix decoded mono or stereo signals into multi-channel audio (5.1 channels or more).

In order to efficiently render spatial audio scenes, the spatial audio coding and processing technologies make use of the spatial characteristics of the multi-channel audio signal. In particular, the time and level differences between the channels of the spatial audio capture are used to approximate the inter-aural cues, which characterize our perception of directional sounds in space. Since the inter-channel time and level differences are only an approximation of what the auditory system is able to detect (i.e. the inter-aural time and level differences at the car entrances), it is of high importance that the inter-channel time difference is relevant from a perceptual aspect. The inter-channel time and level differences (ICTD and ICLD) are commonly used to model the directional components of multi-channel audio signals while the inter-channel cross-correlation (ICC)—that models the inter-aural cross-correlation (IACC)—is used to characterize the width of the audio image. Especially for lower frequencies the stereo image may also be modeled with inter-channel phase differences (ICPD).

It should be noted that the binaural cues relevant for spatial auditory perception are called inter-aural level difference (ILD), inter-aural time difference (ITD) and inter-aural coherence or correlation (IC or IACC). When considering general multichannel signals, the corresponding cues related to the channels are inter-channel level difference (ICLD), inter-channel time difference (ICTD) and inter-channel coherence or correlation (ICC). Since the spatial audio processing mostly operates on the captured audio channels, the "C" is sometimes left out and the terms ITD, ILD and IC are often used also when referring to audio channels. FIG. 1 gives an illustration of these parameters. In FIG. 1 a spatial audio playback with a 5.1 surround system (5 discrete+1 low frequency effect) is shown. Inter-Channel parameters such as ICTD, ICLD and ICC are extracted from the audio channels in order to approximate the ITD, ILD and IACC, which models human perception of sound in space.

In FIG. 2, a typical setup employing the parametric spatial audio analysis is shown. FIG. 2 illustrates a basic block diagram of a parametric stereo coder. A stereo signal pair is input to the stereo encoder 201. The parameter extraction 202 aids the down-mix process, where a downmixer 204 prepares a single channel representation of the two input channels to be encoded with a mono encoder 206. The extracted parameters are encoded by a parameter encoder 208. That is, the stereo channels are down-mixed into a mono signal 207 that is encoded and transmitted to the decoder 203 together with encoded parameters 205 describing the spatial image. Usually some of the stereo parameters are represented in spectral sub-bands on a perceptual frequency scale such as the equivalent rectangular bandwidth (ERB) scale. The decoder performs stereo synthesis based on the decoded mono signal and the transmitted parameters. That is, the decoder reconstructs the single channel using a mono decoder 210 and synthesizes the stereo channels using the parametric representation. The decoded mono signal and received encoded parameters are input to a parametric synthesis unit 212 or process that decodes the parameters, synthesizes the stereo channels using the decoded parameters, and outputs a synthesized stereo signal pair.

Since the encoded parameters are used to render spatial audio for the human auditory system, it is important that the inter-channel parameters are extracted and encoded with perceptual considerations for maximized perceived quality.

Since the side channel may not be explicitly coded, the side channel can be approximated by decorrelation of the mid channel. The decorrelation technique is typically a filtering method used to generate an output signal that is incoherent with the input signal from a fine-structure point of view. The spectral and temporal envelopes of the decorrelated signal shall ideally remain. Decorrelation filters are typically all-pass filters with phase modifications of the input signal.

SUMMARY

The essence of embodiments is an adaptive control of the character of a decorrelator for representation of non-coherent signal components utilized in a multi-channel audio decoder. The adaptation is based on a transmitted performance measure and how it varies over time. Different aspects of the decorrelator may be adaptively controlled using the same basic method in order to match the character of the input signal. One of the most important aspects of decorrelation character is the choice of decorrelator filter length, which is described in the detailed description. Other aspects of the decorrelator may be adaptively controlled in a similar way, such as the control of the strength of the decorrelated component or other aspects that may need to be adaptively controlled to match the character of the input signal.

Provided is a method for adaptation of a decorrelation filter length. The method comprises receiving or obtaining a control parameter, and calculating mean and variation of the control parameter. Ratio of the variation and mean of the control parameter is calculated, and an optimum or targeted decorrelation filter length is calculated based on the current ratio. The optimum or targeted decorrelation filter length is then applied or provided to a decorrelator.

According to a first aspect there is presented an audio signal processing method for adaptively adjusting a decorrelator. The method comprises obtaining a control parameter and calculating mean and variation of the control parameter. Ratio of the variation and mean of the control parameter is calculated, and a decorrelation parameter is calculated based on the said ratio. The decorrelation parameter is then provided to a decorrelator.

The control parameter may be a performance measure. The performance measure may be obtained from estimated reverberation length, correlation measures, estimation of spatial width or prediction gain.

The control parameter is received from an encoder, such as a parametric stereo encoder, or obtained from information already available at a decoder or by a combination of available and transmitted information (i.e. information received by the decoder).

The adaptation of the decorrelation filter length may be done in at least two sub-bands so that each frequency band can have the optimal decorrelation filter length. This means that shorter or longer filters than the targeted length may be used for certain frequency sub-bands or coefficients.

The method is performed by a parametric stereo decoder or a stereo audio codec.

According to a second aspect there is provided an apparatus for adaptively adjusting a decorrelator. The apparatus comprises a processor and a memory, said memory comprising instructions executable by said processor whereby said apparatus is operative to obtain a control parameter and to calculate mean and variation of the control parameter. The apparatus is operative to calculate ratio of the variation and mean of the control parameter, and to calculate a decorrelation parameter based on the said ratio. The apparatus is further operative to provide the decorrelation parameter to a decorrelator.

According to a third aspect there is provided computer program, comprising instructions which, when executed by a processor, cause an apparatus to perform the actions of the method of the first aspect.

According to a fourth aspect there is provided a computer program product, embodied on a non-transitory computer-readable medium, comprising computer code including computer-executable instructions that cause a processor to perform the processes of the first aspect.

According to a fifth aspect there is provided an audio signal processing method for adaptively adjust a decorrelator. The method comprises obtaining a control parameter and calculating a targeted decorrelation parameter based on the variation of said control parameter.

According to a sixth aspect there is provided a multi-channel audio codec comprising means for performing the method of the fifth aspect.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
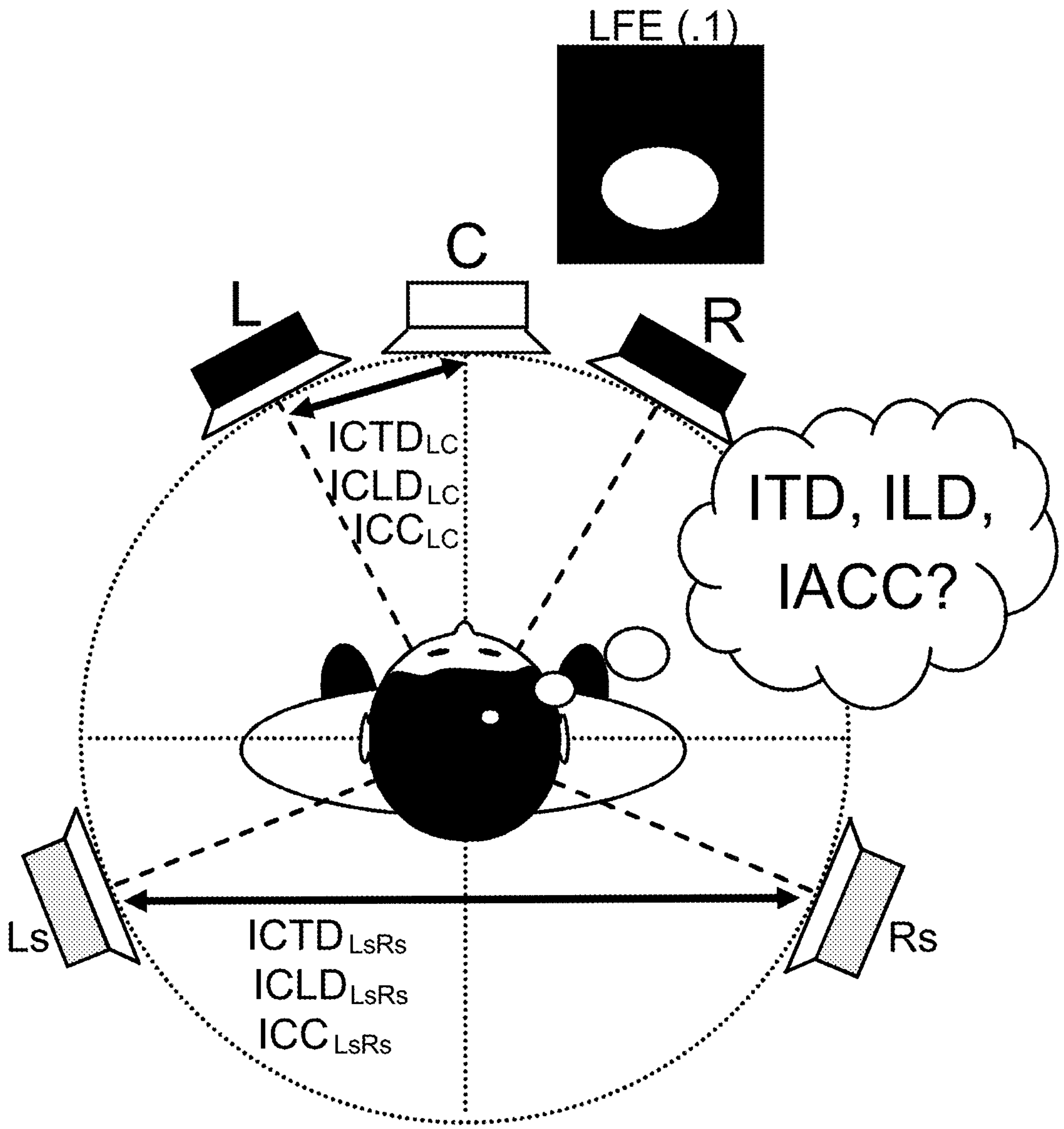
FIG. 1 illustrates spatial audio playback with a 5.1 surround system.

An example embodiment of the present invention and its potential advantages are understood by referring to FIGS. 1 through 8 of the drawings.

Existing solutions for representation of non-coherent signal components are based on time-invariant decorrelation filters and the amount of non-coherent components in the decoded multi-channel audio is controlled by the mixing of decorrelated and non-decorrelated signal components.

An issue of such time-invariant decorrelation filters is that the decorrelated signal will not be adapted to properties of the input signals which are affected by variations in the auditory scene. For example, the ambience in a recording of a single speech source in a low reverb environment would be represented by decorrelated signal components from the same filter as for a recording of a symphony orchestra in a big concert hall with significantly longer reverberation. Even if the amount of decorrelated components is controlled over time the reverberation length and other properties of the decorrelation is not controlled. This may cause the ambience for the low reverb recording sound too spacious while the auditory scene for the high reverb recording is perceived to be too narrow. A short reverberation length, which is desirable for low reverb recordings, often results in metallic and unnatural ambiance for recordings of more spacious recordings.

The proposed solution improves the control of non-coherent audio signals by taking into account how the non-coherent audio varies over time and uses that information to adaptively control the character of the decorrelation, e.g. the reverberation length, in the representation of non-coherent components in a decoded and rendered multi-channel audio signal.

The adaptation can be based on signal properties of the input signals in the encoder and controlled by transmission of one or several control parameters to the decoder. Alternatively, it can be controlled without transmission of an explicit control parameter but from information already available at the decoder or by a combination of available and transmitted information (i.e. information received by the decoder from the encoder).

A transmitted control parameter may for example be based on an estimated performance of the parametric description of the spatial properties, i.e. the stereo image in case of two-channel input. That is, the control parameter may be a performance measure. The performance measure may be obtained from estimated reverberation length, correlation measures, estimation of spatial width or prediction gain.

The solution provides a better control of reverberation in decoded rendered audio signals which improves the perceived quality for a variety of signal types, such as clean speech signals with low reverberation or spacious music signals with large reverberation and a wide audio scene.

The essence of embodiments is an adaptive control of a decorrelation filter length for representation of non-coherent signal components utilized in a multi-channel audio decoder. The adaptation is based on a transmitted performance measure and how it varies over time. In addition, the strength of the decorrelated component may be controlled based on the same control parameter as the decorrelation length.

The proposed solution may operate on frames or samples in the time domain on frequency bands in a filterbank or transform domain, e.g. utilizing Discrete Fourier Transform (DFT), for processing on frequency coefficients of frequency bands. Operations performed in one domain may be equally performed in another domain and the given embodiments are not limited to the exemplified domain.

Figure 2:
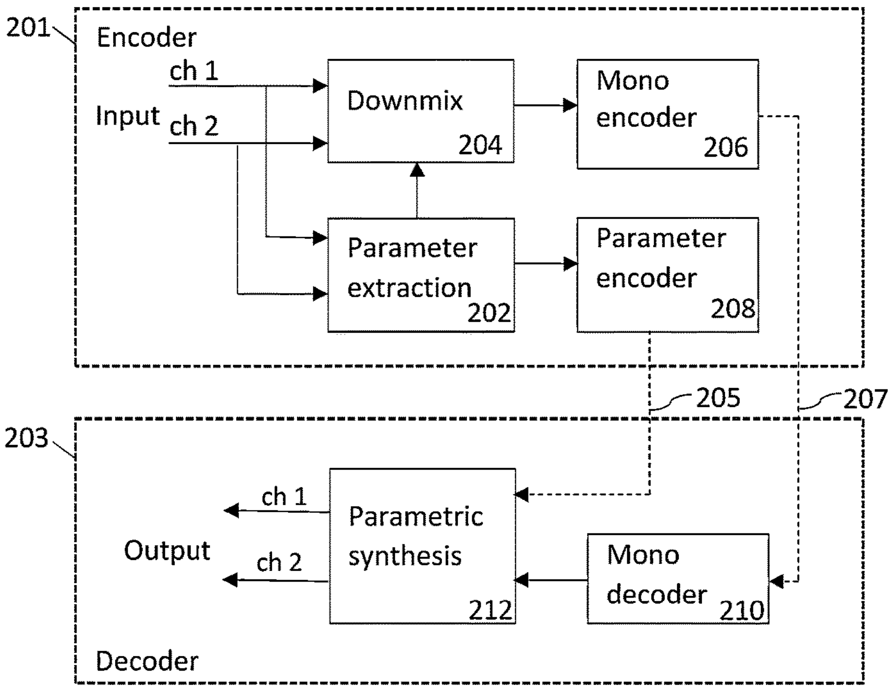
FIG. 2 illustrates a basic block diagram of a parametric stereo coder.
Figure 3:
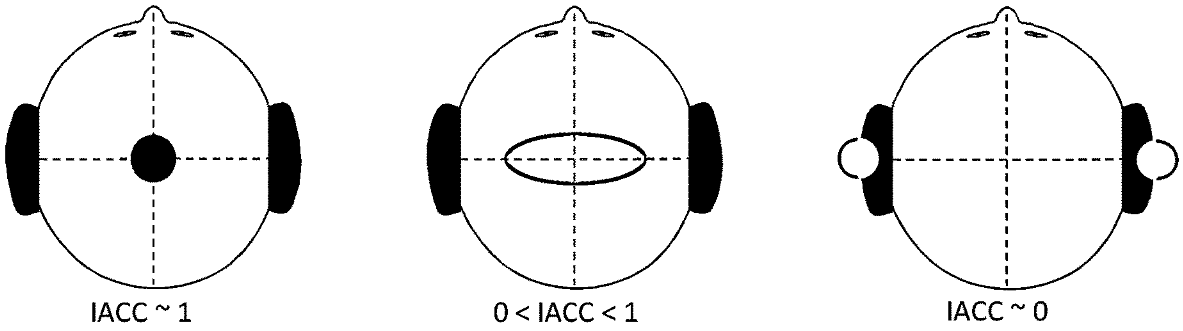
FIG. 3 illustrates width of the auditory object as a function of the IACC.

In one embodiment, the proposed solution is utilized for a stereo audio codec with a coded down-mix channel and a parametric description of the spatial properties, i.e. as illustrated in FIG. 2. The parametric analysis may extract one or more parameters describing non-coherent components between the channels which can be used to adaptively adjust the perceived amount of non-coherent components in the synthesized stereo audio. As illustrated in FIG. 3, the IACC, i.e. the coherence between the channels, will affect the perceived width of a spatial auditory object or scene. When the IACC decreases, the source width increases until the sound is perceived as two distinct uncorrelated audio sources. In order to be able to represent wide ambience in a stereo recording, non-coherent components between the channels have to be synthesized at the decoder.

A down-mix channel of two input channels X and Y may be obtained from $$\begin{pmatrix} M \\ S \end{pmatrix} = U_1 \begin{pmatrix} X \\ Y \end{pmatrix}, \tag{1}$$

where M is the down-mix channel and S is the side channel. The down-mix matrix $U_1$ may be chosen such that the M channel energy is maximized and the S channel energy is minimized. The down-mix operation may include phase or time alignment of the input signals. An example of a passive down-mix is given by $$U_1 = \frac{1}{2}\begin{pmatrix} 1 & 1 \\ 1 & -1 \end{pmatrix}. \tag{2}$$

The side channel S may not be explicitly encoded but parametrically modelled for example by using a prediction filter where S is predicted from the decoded mid channel M and used at the decoder for spatial synthesis. In this case prediction parameters, e.g. prediction filter coefficients, may be encoded and transmitted to the decoder.

Another way to model the side channel is to approximate it by decorrelation of the mid channel. The decorrelation technique is typically a filtering method used to generate an output signal that is incoherent with the input signal from a fine-structure point of view. The spectral and temporal envelopes of the decorrelated signal shall ideally remain. Decorrelation filters are typically all-pass filters with phase modifications of the input signal.

In this embodiment, the proposed solution is used to adaptively adjust a decorrelator used for spatial synthesis in a parametric stereo decoder.

Spatial rendering (up-mix) of the encoded mono channel M is obtained by $$\begin{pmatrix} \hat{X} \\ \hat{Y} \end{pmatrix} = U_2 \begin{pmatrix} \hat{M} \\ D \end{pmatrix} \tag{3}$$

where $U_2$ is an up-mix matrix and D is ideally uncorrelated to $\hat{M}$ on a fine-structure point of view. The up-mix matrix controls the amount of $\hat{M}$ and D in the synthesized left ($\hat{X}$) and right ($\hat{Y}$) channel. It is to be noted that the up-mix can also involve additional signal components, such as a coded residual signal.

An example of an up-mix matrix utilized in parametric stereo with transmission of ILD and ICC is given by $$U_2 = \begin{pmatrix} \lambda_1 & 0 \\ 0 & \lambda_2 \end{pmatrix} \begin{pmatrix} \cos(\alpha+\beta) & \sin(\alpha+\beta) \\ \cos(-\alpha+\beta) & \sin(-\alpha+\beta) \end{pmatrix}, \tag{4}$$

where $$\lambda_1 = \frac{10^{\frac{ILD}{20}}}{\sqrt{1+10^{\frac{ILD}{10}}}} \tag{5}$$

$$\lambda_2 = \frac{1}{\sqrt{1+10^{\frac{ILD}{10}}}}. \tag{6}$$

The rotational angle α is used to determine the amount of correlation between the synthesized channels and is given by $$\alpha = \frac{1}{2}\arccos(ICC). \tag{7}$$

The overall rotation angle β is obtained as $$\beta = \arctan\left(\frac{\lambda_2-\lambda_1}{\lambda_2+\lambda_1}\tan(ICC)\right). \tag{8}$$

The ILD between the two channels x[n] and y[n] is given by $$ILD = 10\log_{10}\frac{\sum x[n]^2}{\sum y[n]^2} \tag{9}$$

where n=[1, . . . , N] is the sample index over a frame of N samples.

The coherence between channels can be estimated through the inter-channel cross correlation (ICC). A conventional ICC estimation relies on the cross-correlation function (CCF) $r_{xy}$ which is a measure of similarity between two waveforms x[n] and y[n], and is generally defined in the time domain as $$r_{xy}[n, \tau] = E[x[n]y[n+\tau]], \tag{10}$$

where t is the time-lag and E [.] the expectation operator. For a signal frame of length N the cross-correlation is typically estimated as $$r_{xy}[\tau] = \sum_{n=0}^{N-1} x[n]y[n+\tau] \tag{11}$$

The ICC is then obtained as the maximum of the CCF which is normalized by the signal energies as follows $$ICC = \max\left(\frac{r_{xy}[\tau]}{\sqrt{r_{xx}[0]r_{yy}[0]}}\right). \tag{12}$$

Additional parameters may be used in the description of the stereo image. These can for example reflect phase or time differences between the channels.

A decorrelation filter may be defined by its impulse response $h_d(n)$ or transfer function $H_d(k)$ in the DFT domain where n and k are the sample and frequency index, respectively. In the DFT domain a decorrelated signal $M_d$ is obtained by $$M_d[k] = H_d[k]\hat{M}[k] \tag{13}$$

where k is a frequency coefficient index. Operating in the time domain a decorrelated signal is obtained by filtering $$m_d[n] = h_d[n] * \hat{m}[n] \tag{14}$$

where n is a sample index.

In one embodiment a reverberator based on A serially connected all-pass filters is obtained as $$H[z] = \prod_{a=1}^{A} \frac{\psi[a] + z^{-d[a]}}{1 + \psi[a]z^{-d[a]}} \tag{15}$$

where ψ[a] and d [a] specifies the decay and the delay of the feedback. This is just an example of a reverberator that may be used for decorrelation and alternative reverberators exist, fractional sample delays may for example be utilized. The decay factors ψ[a] may be chosen in the interval [0,1) as a value larger than 1 would result in an instable filter. By choosing a decay factor ψ[a]=0, the filter will be a delay of d[a] samples. In that case, the filter length will be given by the largest delay d [a] among the set of filters in the reverberator.

Multi-channel audio, or in this example two-channel audio, has naturally a varying amount of coherence between the channels depending on the signal characteristics. For a single speaker recorded in a well-damped environment there will be a low amount of reflections and reverberation which will result in high coherence between the channels. As the reverberation increases the coherence will generally decrease. This means that for clean speech signals with low amount of noise and ambience the length of the decorrelation filter should probably be shorter than for a single speaker in a reverberant environment. The length of the decorrelator filter is one important parameter that controls the character of the generated decorrelated signal. Embodiments of the invention may also be used to adaptively control other parameters in order to match the character of the decorrelated signal to that of the input signal, such as parameters related to the level control of the decorrelated signal.

By utilizing a reverberator for rendering of non-coherent signal components the amount of delay may be controlled in order to adapt to different spatial characteristics of the encoded audio. More generally one can control the length of the impulse response of a decorrelation filter. As mentioned above controlling the filter length can be equivalent to controlling the delay of a reverberator without feedback.

In one embodiment the delay d of a reverberator without feedback, which in this case is equivalent to the filter length, is a function $f_1(\cdot)$ of a control parameter $c_1$ $$d = f_1(c_1). \tag{16}$$

A transmitted control parameter may for example be based on an estimated performance of the parametric description of the spatial properties, i.e. the stereo image in case of two-channel input. The performance measure r may for example be obtained from estimated reverberation length, correlation measures, estimation of spatial width or prediction gain. The decorrelation filter length d may then be controlled based on this performance measure, i.e. $c_1$ is the performance measure r. One example of a suitable control function $f_1(\cdot)$ is given by $$d = f_1(r) = D_{max} - \max\left(0, D_{max} - \gamma_1\left(1 - \frac{g(r)}{\theta_1}\right)\right), \tag{17}$$

where $\gamma_1$ is a tuning parameter typically in the range [0, $D_{max}$] with a maximum allowed delay $D_{max}$ and $\theta_1$ is an upper limit of g(r). If g(r)>$\theta_1$ a shorter delay is chosen, e.g. d=1.

$\theta_1$ is a tuning parameter that may for example be set to $\theta_1$=7.0. There is a relation between $\theta_1$ and the dynamics of g(r) and in another embodiment it may for example be $\theta_1$=0.22. The sub-function g(r) may be defined as the ratio between the change of r and the average r over time. This ratio will go higher for sounds that have a lot of variation in the performance measure compared to its mean value, which is typically the case for sparse sounds with little background noise or reverberation. For more dense sounds, like music or speech with background noise this ratio will be lower and therefor works like a sound classifier, classifying the character of the non-coherent components of the original input signal. The ratio can be calculated as $$g(r) = \min\left(\theta_{max}, \max\left(\frac{\overline{r_c}}{r_{mean}}, \theta_{min}\right)\right), \tag{18}$$

where $\theta_{max}$ is an upper limit e.g. set to 200 and $\theta_{min}$ is a lower e.g. set to 0. The limits may for example be related to the tuning parameter $\theta_1$, e.g. $\theta_{max}=1.5\theta_1$.

An estimation of the mean of a transmitted performance measure is for frame i obtained as $$\begin{cases} r_{mean}[i] = \alpha_{pos} r[i] + (1-\alpha_{pos}) r_{mean}[i-1] & \text{if } r[i] > r_{mean}[i-1] \\ r_{mean}[i] = \alpha_{neg} r[i] + (1-\alpha_{neg}) r_{mean}[i-1] & \text{otherwise} \end{cases} . \tag{19}$$

For the first frame $r_{mean}$ [i−1] may be initialized to 0. The smoothing factors $\alpha_{pos}$ and $\alpha_{neg}$ may be chosen such that upward and downward changes of r are followed differently. In one example $\alpha_{pos}=0.005$ and $\alpha_{neg}=0.5$ which means that the mean estimation follows to a larger extent the minima of the mean performance measure over time. In another embodiment, the positive and negative smoothing factors are equal, e.g. $\alpha_{pos}=\alpha_{neg}=0.1$.

Similarly, the smoothed estimation of the performance measure variation is obtained as $$\begin{cases} \overline{r_c}[i] = \beta_{pos} r_c[i] + (1-\beta_{pos}) \overline{r_c}[i-1] & \text{if } r_c[i] > \overline{r_c}[i-1] \\ \overline{r_c}[i] = \beta_{neg} r_c[i] + (1-\beta_{neg}) \overline{r_c}[i-1] & \text{otherwise} \end{cases} . \tag{20}$$

where $$r_c[i] = |r[i] - r_{mean}[i]|. \tag{21}$$

Alternatively, the variance of r may be estimated as $$\begin{cases} \sigma_r^2[i] = \dfrac{\beta_{pos}}{1-\beta_{pos}} r_c^2[i] + (1-\beta_{pos})\sigma_r^2[i-1] & \text{if } r_c^2[i] > (1-\beta_{pos})\sigma_r^2[i-1] \\ \sigma_r^2[i] = \dfrac{\beta_{neg}}{1-\beta_{neg}} r_c^2[i] + (1-\beta_{neg})\sigma_r^2[i-1] & \text{otherwise} \end{cases} \tag{22}$$

The ratio g(r) may then relate the standard deviation $\sqrt{\sigma_r^2}$ to the mean $r_{mean}$, i.e.

$$g(r) = \min\left(\theta_{max}, \max\left(\frac{\sigma_r}{r_{mean}}, \theta_{min}\right)\right), \tag{23}$$

or the variance may be related to the squared mean, i.e.

$$g(r) = \min\left(\theta_{max}, \max\left(\frac{\sigma_r^2}{r_{mean}^2}, \theta_{min}\right)\right). \tag{24}$$

Another estimation of the standard deviation could be given by $$\begin{cases} \sigma_r[i] = \dfrac{\beta_{pos}}{1-\beta_{pos}} r_c[i] + (1-\beta_{pos})\sigma_r[i-1] & \text{if } r_c[i] > (1-\beta_{pos})\sigma_r[i-1] \\ \sigma_r[i] = \dfrac{\beta_{neg}}{1-\beta_{neg}} r_c[i] + (1-\beta_{neg})\sigma_r[i-1] & \text{otherwise} \end{cases} , \tag{25}$$

which has lower complexity.

The smoothing factors $\beta_{pos}$ and $\beta_{neg}$ may be chosen such that upward and downward changes of re are followed differently. In one example $\beta_{pos}=0.5$ and $\beta_{neg}=0.05$ which means that the mean estimation follows to a larger extent the maxima of the change in the performance measure over time. In another embodiment, the positive and negative smoothing factors are equal, e.g. $\beta_{pos}=\beta_{neg}=0.1$.

Generally for all given examples the transition between the two smoothing factors may be made for any threshold that the update value of the current frame is compared to. I.e. in the given example of equation 25 $r_c[i]>\theta_{thres}$.

In addition, the ratio g(r) controlling the delay may be smoothed over time according to $$\overline{g}[i] = \alpha_s g[i] + (1-\alpha_s)\overline{g}[i-1], \tag{26}$$

where the smoothing factor as is a tuning factor e.g. set to 0.01. This means that g(r[i]) in equation 17 is replaced by $\overline{g}[i]$ for the frame i.

In another embodiment, the ratio g(r) is conditionally smoothed based on the performance measure $c_1$, i.e.

$$\overline{g}[i] = f(c_1, g[i], \overline{g}[i-1]). \tag{27}$$

One example of such function is $$\begin{cases} \overline{g}[i] = \gamma_{pos}(c_1) r[i] + (1-\gamma_{pos}(c_1))\overline{g}[i-1] & \text{if } g[i] > \overline{g}[i-1] \\ \overline{g}[i] = \gamma_{neg}(c_1) r[i] + (1-\gamma_{neg}(c_1))\overline{g}[i-1] & \text{otherwise} \end{cases} , \tag{28}$$

where the smoothing parameters are a function of the performance measure. For example $$\begin{cases} \gamma_{pos} = \kappa_{pos\_high}, \gamma_{neg} = \kappa_{neg\_high} & \text{if } f_{thres}(c_1) > \theta_{high} \\ \gamma_{pos} = \kappa_{pos\_low}, \gamma_{neg} = \kappa_{neg\_low} & \text{otherwise} \end{cases} . \tag{29}$$

Depending on the performance measure used the function $f_{thres}$ may be differently chosen. It can for example be an average, a percentile (e.g. the median), the minimum or the maximum of $c_1$ over a set of frames or samples or over a set of frequency sub-bands or coefficients, i.e. for example $$f_{thres}(c_1) = \max(c_1[b]), \tag{30}$$

where $b=b_0, \ldots b_{N-1}$ is an index for N frequency sub-bands. The smoothing factors control the amount of smoothing when the threshold $\theta_{high}$, e.g. set to 0.6, is exceeded, respectively not exceeded and can be equal for positive and negative updates or different, e.g. $\kappa_{pos\_high}=0.03$, $\kappa_{neg\_high}=0.05$, $\kappa_{pos\_low}=0.1$, $\kappa_{neg\_low}=0.001$.

It may be noted that additional smoothing or limitation of change in the obtained decorrelation filter length between samples or frames is possible in order to avoid artifacts. In addition, the set of filter lengths utilized for decorrelation may be limited in order to reduce the number of different colorations obtained when mixing signals. For example, there might be two different lengths where the first one is relatively short and the second one is longer.

In one embodiment, a set of two available filters of different lengths $d_1$ and $d_2$ are used. A targeted filter length d may for example be obtained as $$d = \min\left(d_2, d_1 + \gamma_1\left(1 - \frac{g(r)}{\theta_1}\right)\right), \tag{31}$$

where $\gamma_1$ is a tuning parameter that for example is given by $$\gamma_1 = d_2 - d_1 + \delta, \tag{32}$$

where $\delta$ is an offset term that e.g. can be set to 2. Here $d_2$ is assumed to be larger than $d_1$. It is noted that the target filter length is a control parameter but different filter lengths or reverberator delays may be utilized for different frequencies. This means that shorter or longer filters than the targeted length may be used for certain frequency sub-bands or coefficients.

In this case, the decorrelation filter strength s controlling the amount of decorrelated signal D in the synthesized channels X and Y may be controlled by the same control parameters, in this case with one control parameter, the performance measure $c_1 \equiv r$.

In another embodiment, the adaptation of the decorrelation filter length is done in several, i.e. at least two, sub-bands so that each frequency band can have the optimal decorrelation filter length.

In an embodiment where the reverberator uses a set of filters with feedback, as depicted in equation 15, the amount of feedback, $\psi[a]$, may also be adapted in similar way as the delay parameter d[a]. In such embodiment the length of the generated ambiance is a combination of both these parameters and thus both may need to be adapted in order to achieve a suitable ambiance length.

In yet another embodiment, the decorrelation filter length or reverberator delay d and decorrelation signal strength s are controlled as functions of two or more different control parameters, i.e.

$$d = f_2(c_{21}, c_{22}, \ldots), \tag{33}$$

$$s = f_3(c_{31}, c_{32}, \ldots). \tag{34}$$

In yet another embodiment, the decorrelation filter length and decorrelation signal strength are controlled by an analysis of the decoded audio signals.

The reverberation length may additionally be specially controlled for transients, i.e. sudden energy increases, or for other signals with special characteristics.

As the filter changes over time there should be some handling of changes over frames or samples. This may for example be interpolation or window functions with overlapping frames. The interpolation can be made between previous filters of their respectively controlled length to the currently targeted filter length over several samples or frames. The interpolation may be obtained by successively decrease the gain of previous filters while increasing the gain of the current filter of currently targeted length over samples or frames. In another embodiment, the targeted filter length controls the filter gain of each available filter such that there is a mixture of available filters of different lengths when the targeted filter length is not available. In the case of two available filters $h_1$ and $h_2$ of length $d_1$ and $d_2$ respectively, their gains $s_1$ and $s_2$ may be obtained as $$s_1 = f_3(d_1, d_2, c_1), \tag{35}$$

$$s_2 = f_4(d_1, d_2, c_1). \tag{36}$$

The filter gains may also be depending on each other, e.g. in order to obtain equal energy of the filtered signal, i.e. $s_2 = f(s_1)$ in case $h_1$ is the reference filter which gain is controlled by $c_1$. For example the filter gain $s_1$ may be obtained as $$s_1 = (d_2 - d)/(d_2 - d_1), \tag{37}$$

where d is the targeted filter length in the range $[d_1, d_2]$ and $d_2 > d_1$. The second filter gain may then for example be obtained as $$s_2 = \sqrt{1 - s_1^2}. \tag{38}$$

The filtered signal $m_d[n]$ is then obtained as $$m_d[n] = (s_1 h_1[n] + s_2 h_2[n]) * \hat{m}[n], \tag{39}$$

if the filtering operation is performed in the time domain.

In the case the decorrelation signal strength s is controlled by a control parameter $c_1$ it may be beneficial to control it as a function $f_4(\cdot)$ of control parameters of previous frames and the decorrelation filter length d. I.e.

$$s[i] = f_4(d, c_1[i], c_1[i-1], \ldots, c_1[i-N_M]). \tag{40}$$

One example of such function is $$s[i] = \min(\beta_4 c_1[i-d], c_1[i-d](1-\alpha_4) + \alpha_4 c_1[i]), \tag{41}$$

where $\alpha_4$ and $\beta_4$ are tuning parameters, e.g. $\alpha_4 = 0.8$ or $\alpha_4 = 0.6$ and $\beta_4 = 1.0$. $\alpha_4$ should typically be in the range [0,1] while $B_4$ may be larger than one as well.

In the case of a mixture of more than one filter the strength s of the filtered signal $m_d[n]$ in the up-mix with $\hat{m}[n]$ may for example be obtained based on a weighted average, i.e. in case of two filters $h_1$ and $h_2$ by $$s[i] = \min(\beta_4 w[i], w[i](1-\alpha_4) + \alpha_4 c_1[i]), \tag{42}$$

where $$w[i] = s_1 c_1[i-d_1] + s_2 c_1[i-d_2]. \tag{43}$$

Figure 4:
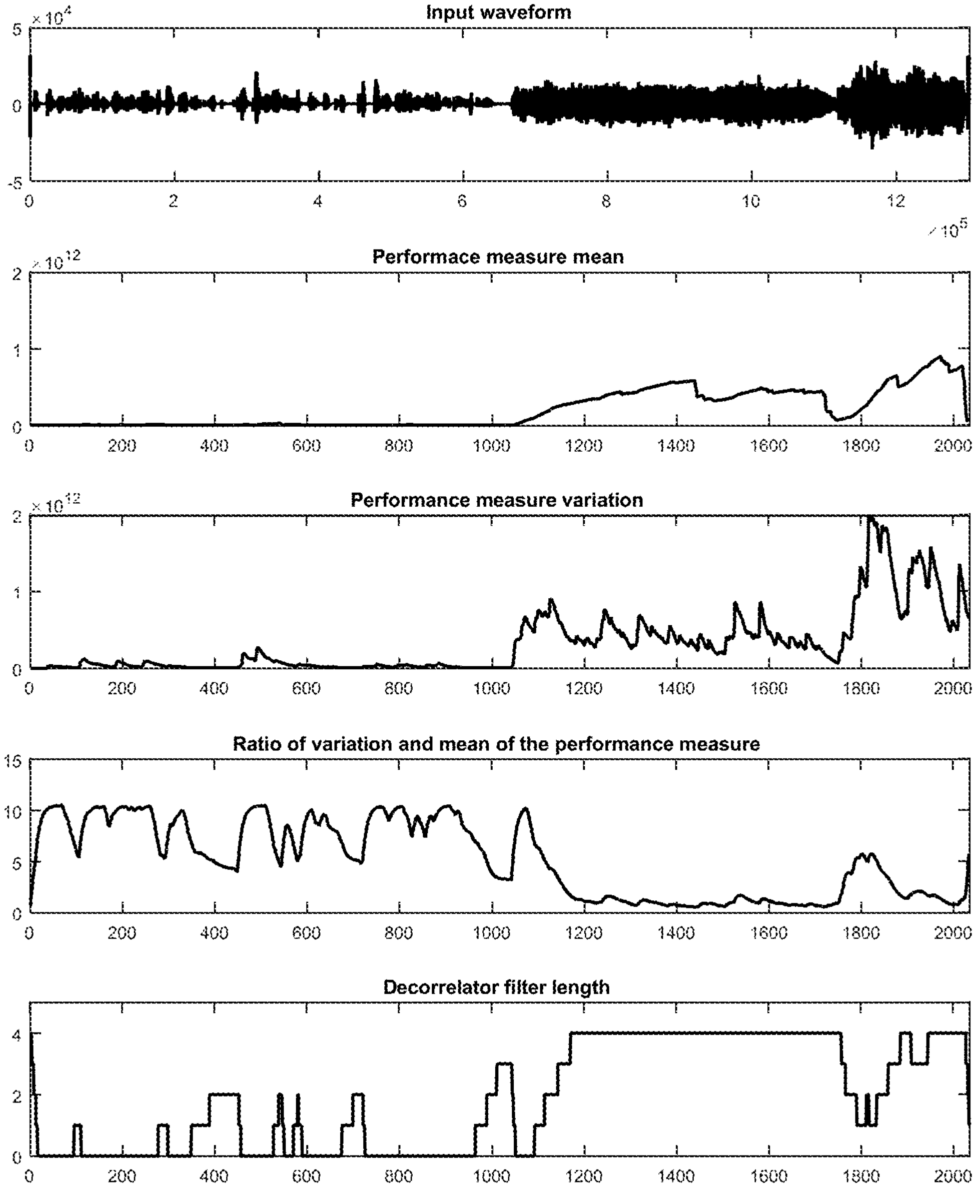
FIG. 4 shows an example of an audio signal.

FIG. 4 shows an example of a signal where the first half contains clean speech and the second half classical music. The performance measure mean is relatively high for the second half containing music. The performance measure variation is also higher for the second half but the ratio between them is considerably lower. A signal where the performance measure variation is much higher than the performance measure mean is considered to be a signal with continuous high amounts of diffuse components and therefore the length of the decorrelation filter should be lower for the first half of this example than the second. It is to be noted that the signals in the graphs have all been smoothed and partly restricted for a more controlled behavior. In this case the targeted decorrelation filter length is expressed in a discrete number of frames but in other embodiments the filter length may vary continuously.

Figure 5:
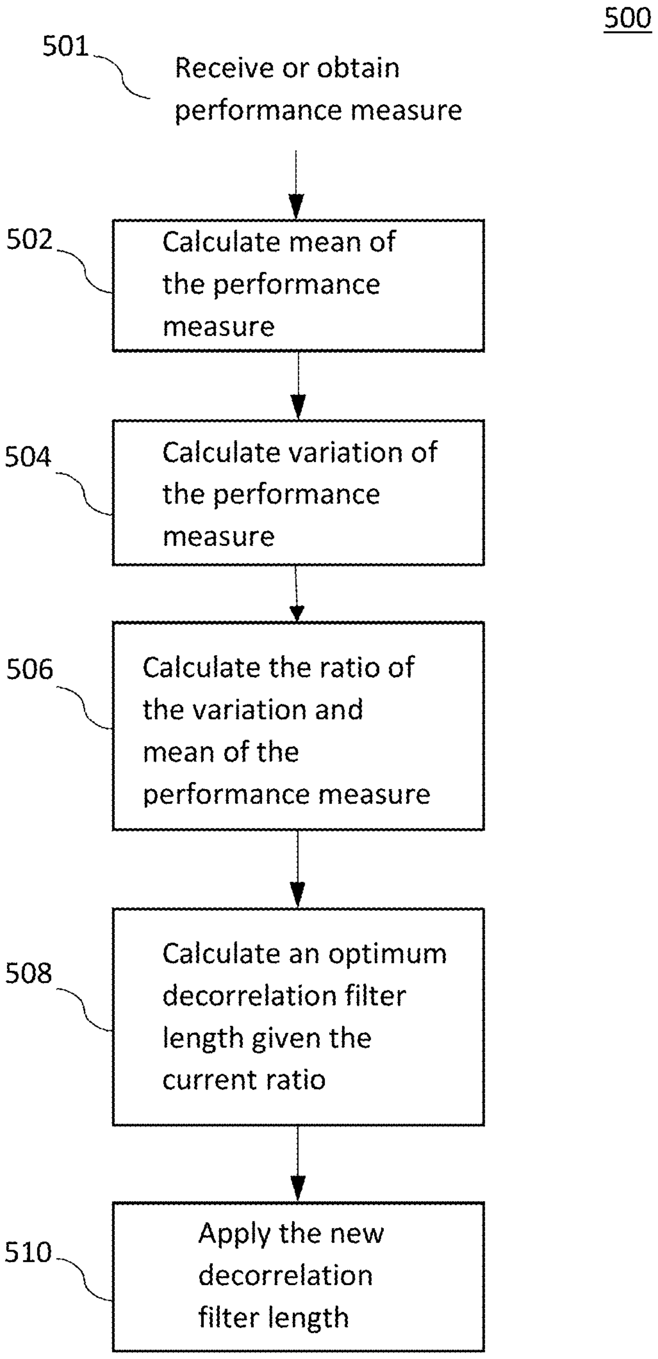
FIG. 5 is a block diagram describing the method according to an embodiment.
Figure 6:
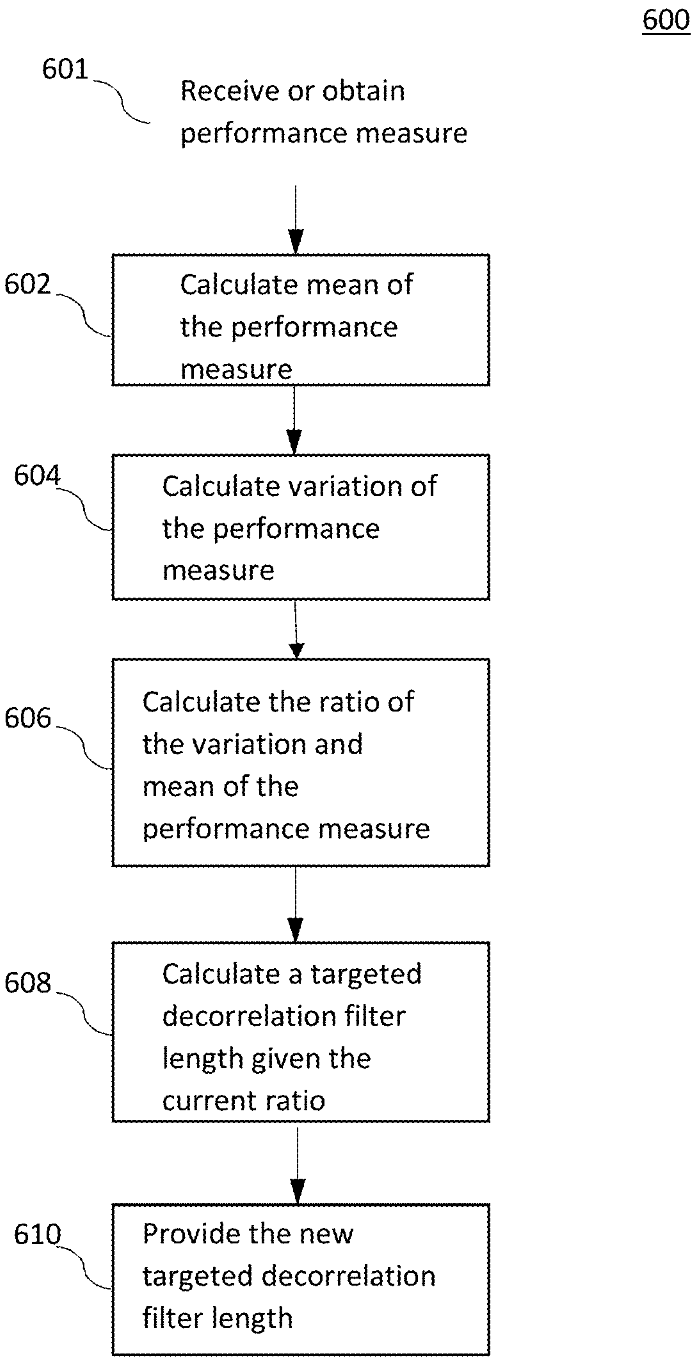
FIG. 6 is a block diagram describing the method according to an alternative embodiment.

FIGS. 5 and 6 illustrate an example method for adjusting a decorrelator. The method comprises obtaining a control parameter, and calculating mean and variation of the control parameter. Ratio of the variation and mean of the control parameter is calculated, and a decorrelation parameter is calculated based on the ratio. The decorrelation parameter is then provided to a decorrelator.

FIG. 5 describes steps involved in the adaptation of the decorrelation filter length. The method 500 starts with receiving 501 a performance measure parameter, i.e. a control parameter. The performance measure is calculated in an audio encoder and transmitted to an audio decoder. Alternatively, the control parameter is obtained from information already available at a decoder or by a combination of available and transmitted information. First a mean and a variation of the performance measure is calculated as shown in blocks 502 and 504. Then the ratio of the variation and the mean of the performance measure is calculated 506. An optimum decorrelation filter length is calculated 508 based on the ratio. Finally, a new decorrelation filter length is applied 510 to obtain a decorrelated signal from, e.g. the received mono signal.

FIG. 6 describes another embodiment of the adaptation of the decorrelation filter length. The method 600 starts with receiving 601 a performance measure parameter, i.e. a control parameter. The performance measure is calculated in an audio encoder and transmitted to an audio decoder. Alternatively, the control parameter is obtained from information already available at a decoder or by a combination of available and transmitted information. First a mean and a variation of the performance measure is calculated as shown in blocks 602 and 604. Then the ratio of the variation and the mean of the performance measure is calculated 606. A targeted decorrelation filter length is calculated 608 based on the ratio. Final step is to provide 610 the new targeted decorrelation filter length to a decorrelator.

The methods may be performed by a parametric stereo decoder or a stereo audio codec.

Figure 7:
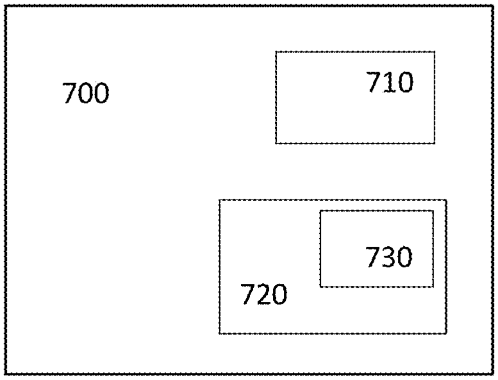
FIG. 7 shows an example of an apparatus.

FIG. 7 shows an example of an apparatus performing the method illustrated in FIGS. 5 and 6. The apparatus 700 comprises a processor 710, e.g. a central processing unit (CPU), and a computer program product 720 in the form of a memory for storing the instructions, e.g. computer program 730 that, when retrieved from the memory and executed by the processor 710 causes the apparatus 700 to perform processes connected with embodiments of adaptively adjusting a decorrelator The processor 710 is communicatively coupled to the memory 720. The apparatus may further comprise an input node for receiving input parameters, i.e., the performance measure, and an output node for outputting processed parameters such as a decorrelation filter length. The input node and the output node are both communicatively coupled to the processor 710.

The apparatus 700 may be comprised in an audio decoder, such as the parametric stereo decoder shown in a lower part of FIG. 2. It may be comprised in a stereo audio codec.

Figure 8:
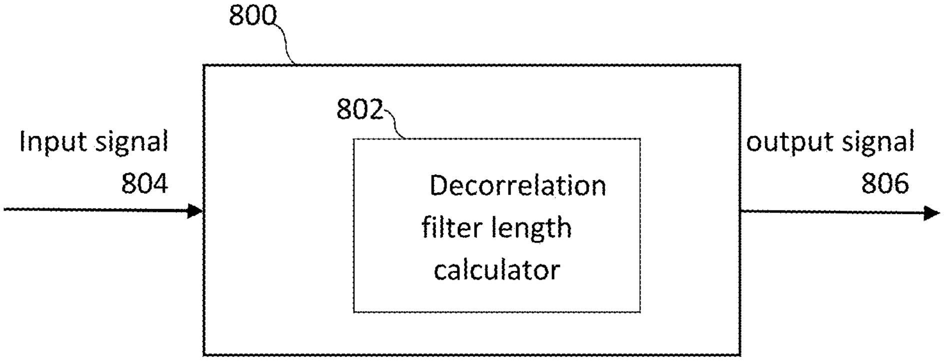
FIG. 8 shows a device comprising a decorrelation filter length calculator.

FIG. 8 shows a device 800 comprising a decorrelation filter length calculator 802. The device may be a decoder, e.g., a speech or audio decoder. An input signal 804 is an encoded mono signal with encoded parameters describing the spatial image. The input parameters may comprise the control parameter, such as the performance measure. The output signal 806 is a synthesized stereo or multichannel signal, i.e. a reconstructed audio signal. The device may further comprise a receiver (not shown) for receiving the input signal from an audio encoder. The device may further comprise a mono decoder and a parametric synthesis unit as shown in FIG. 2.

In an embodiment, the decorrelation length calculator 802 comprises an obtaining unit for receiving or obtaining a performance measure parameter, i.e. a control parameter. It further comprises a first calculation unit for calculating a mean and a variation of the performance measure, a second calculation unit for calculating the ratio of the variation and the mean of the performance measure, and a third calculation unit for calculating targeted decorrelation filter length. It may further comprise a providing unit for providing the targeted decorrelation filter length to a decorrelation unit.

By way of example, the software or computer program 730 may be realized as a computer program product, which is normally carried or stored on a computer-readable medium, preferably non-volatile computer-readable storage medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device.

Embodiments of the present invention may be implemented in software, hardware, application logic or a combination of software, hardware and application logic. The software, application logic and/or hardware may reside on a memory, a microprocessor or a central processing unit. If desired, part of the software, application logic and/or hardware may reside on a host device or on a memory, a microprocessor or a central processing unit of the host. In an example embodiment, the application logic, software or an instruction set is maintained on any one of various conventional computer-readable media.

Abbreviations

ILD/ICLD Inter-channel Level Difference
IPD/ICPD Inter-channel Phase Difference
ITD/ICTD Inter-channel Time difference
IACC Inter-Aural Cross Correlation
ICC Inter-Channel correlation
DFT Discrete Fourier Transform
CCF Cross Correlation Function

The invention claimed is:

1. An audio signal processing method performed by an audio decoder for adaptive adjustment of decorrelation, the method comprising:

receiving a control parameter;

estimating mean of the control parameter;

estimating variation of the control parameter;

determining a ratio of the variation and mean of the control parameter; and calculating a targeted decorrelation filter length based on said ratio.

2. The method of claim 1, wherein the control parameter is associated with a prediction gain.

3. The method of claim 2, wherein the mean and variation of the control parameter are estimated using a first order autoregressive process.

4. The method of claim 3, wherein the mean of the control parameter is estimated based on a first smoothing parameter $\alpha_{Mean}$ and $1-\alpha_{Mean}$, where $\alpha_{Mean}$ is a real number.

5. The method of claim 4, wherein the variation of the control parameter is estimated based on a second smoothing parameter $\alpha_{variation}$ and $1-\alpha_{variation}$, where $\alpha_{variation}$ is a real number.

6. The method of claim 5, wherein the ratio of the variation and mean of the control parameter is determined based on min (A, B), where A is a real number and B is determined based on the variation of the control parameter and the mean of the control parameter.

7. The method of claim 6, wherein B is determined based on $\bar{r}_c/r_{mean}$ where $\bar{r}_c$ is the variation of the control parameter and $r_{mean}$ is the mean of the control parameter.

8. The method of claim 1, wherein the targeted decorrelation filter length is calculated based on:

$$\min\left(d2,\ d1 + (\delta + d2 - d1)\left(1 - \frac{A}{B}\right)\right)$$

where d1 is a first filter length, d2 is a second filter length that is larger than d1, δ is an offset, A is a real number which is determined based on the ratio of the variation and mean of the control parameter, and B is a real number.

9. An audio decoder for adaptive adjustment of decorrelation, the audio decoder comprising:

processing circuitry; and a memory, the memory containing instructions executable by the processing circuitry, whereby the audio decoder is operative to:

receive a control parameter;

estimate mean of the control parameter;

estimate variation of the control parameter;

determine a ratio of the variation and mean of the control parameter; and calculate a targeted decorrelation filter length based on said ratio.

10. The audio decoder of claim 9, wherein the control parameter is associated with a prediction gain.

11. The audio decoder of claim 10, wherein the mean and variation of the control parameter are estimated using a first order autoregressive process.

12. The audio decoder of claim 11, wherein the mean of the control parameter is estimated based on a first smoothing parameter $\alpha_{Mean}$ and $1-\alpha_{Mean}$, where $\alpha_{Mean}$ is a real number.

13. The audio decoder of claim 12, wherein the variation of the control parameter is estimated based on a second smoothing parameter $\alpha_{variation}$ and $1-\alpha_{variation}$, where $\alpha_{variation}$ is a real number.

14. The audio decoder of claim 13, wherein the ratio of the variation and mean of the control parameter is determined based on min (A, B), where A is a real number and B is determined based on the variation of the control parameter and the mean of the control parameter.

15. The audio decoder of claim 14, wherein B is determined based on $\bar{r}_c/r_{mean}$ where $\bar{r}_c$ is the variation of the control parameter and $r_{mean}$ is the mean of the control parameter.

16. The audio decoder of claim 9, wherein the targeted decorrelation filter length is calculated based on:

$$\min\left(d2,\ d1 + (\delta + d2 - d1)\left(1 - \frac{A}{B}\right)\right)$$

where d1 is a first filter length, d2 is a second filter length that is larger than d1, δ is an offset, A is a real number which is determined based on the ratio of the variation and mean of the control parameter, and B is a real number.

17. A computer program product comprising a non-transitory computer readable medium storing instructions which when executed by processing circuitry cause the processing circuitry to:

receive a control parameter;

estimate mean of the control parameter;

estimate variation of the control parameter;

determine a ratio of the variation and mean of the control parameter; and calculate a targeted decorrelation filter length based on said ratio.

18. The computer program product of claim 17, wherein the ratio of the variation and mean of the control parameter is determined based on min (A, B), where A is a real number and B is determined based on the variation of the control parameter and the mean of the control parameter.

19. The computer program product of claim 18, wherein B is determined based on $\bar{r}_c/r_{mean}$ where $\bar{r}_c$ is the variation of the control parameter and $r_{mean}$ is the mean of the control parameter.

20. The computer program product of claim 17, wherein the targeted decorrelation filter length is calculated based on:

$$\min\left(d2,\ d1 + (\delta + d2 - d1)\left(1 - \frac{A}{B}\right)\right)$$

where d1 is a first filter length, d2 is a second filter length that is larger than d1, δ is an offset, A is a real number which is determined based on the ratio of the variation and mean of the control parameter, and B is a real number.

* * * * *